(12) United States Patent
Kimbara et al.

(10) Patent No.: US 7,240,549 B2
(45) Date of Patent: Jul. 10, 2007

(54) MEASUREMENT OF GAS FUEL AMOUNT

(75) Inventors: Masahiko Kimbara, Kariya (JP); Daigoro Mori, Mishima (JP); Takehiro Nito, Toyota (JP); Hidehito Kubo, Kariya (JP); Makoto Tsuzuki, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 392 days.

(21) Appl. No.: 10/969,014

(22) Filed: Oct. 21, 2004

(65) Prior Publication Data

US 2005/0166673 A1 Aug. 4, 2005

(30) Foreign Application Priority Data

Oct. 22, 2003 (JP) ............................ 2003-361447

(51) Int. Cl.
*G01F 23/20* (2006.01)
(52) U.S. Cl. ...................................... 73/296
(58) Field of Classification Search ................ 73/296
See application file for complete search history.

(56) References Cited

U.S. PATENT DOCUMENTS 5,386,736 A * 2/1995 Spillman, Jr. ................. 73/865
2004/0079150 A1 * 4/2004 Breed et al. .................. 73/291

FOREIGN PATENT DOCUMENTS

| CN | 2330984 Y | 7/1999 |
| CN | 2418470 Y | 2/2001 |
| DE | 29 28 767 C2 | 1/1981 |
| DE | 36 39 455 A1 | 5/1988 |
| DE | 39 12 781 A1 | 10/1990 |
| DE | 195 19 712 A1 | 12/1996 |
| DE | 102 58 235 A1 | 7/2004 |
| GB | 2 054 162 A | 2/1981 |
| GB | 2 289 542 A | 11/1995 |
| JP | A-08-152352 | 6/1996 |
| JP | A-11-082206 | 3/1999 |
| JP | A-2000-055728 | 2/2000 |
| JP | A-2000-121408 | 4/2000 |
| KR | 2002-0055696 | 7/2002 |

* cited by examiner

*Primary Examiner*—Hezron Williams
*Assistant Examiner*—Paul M. West
(74) *Attorney, Agent, or Firm*—Oliff & Berridge, PLC

(57) ABSTRACT

A control unit 40 acquires acceleration α sensed by an acceleration sensor 31, and if the control unit 40 determines that acceleration α does not equal zero, the control unit 40 again acquires acceleration α. In the event that the control unit 40 decides that acceleration α equals zero, the control unit 40 acquires the weight M sensed by the weight sensor 30. The control unit 40 continues sampling of weight M until a predetermined sampling period has elapsed. Once the sampling period has elapsed, the control unit 40 calculates the average of weight M obtained through sampling, and uses the calculated average and a map to determine hydrogen amount.

7 Claims, 7 Drawing Sheets

MEASUREMENT OF GAS FUEL AMOUNT

BACKGROUND OF THE INVENTION

1. Field of the Invention

The present invention relates to an amount measuring apparatus and an amount measuring method for measuring the remaining fuel amount in a fuel container.

2. Description of the Related Art

Where a fuel container is carried on board a vehicle, the sensed fuel amount may include error due to shifting occurring with vibration or acceleration and deceleration associated with motion of the vehicle, or with change in attitude of the vehicle. To solve this problem, there has been proposed a technique of waiting until the effects of vibration or the like associated with vehicle motion disappear (i.e. until the amount stabilizes) before reflecting a fuel amount value on the fuel gauge.

SUMMARY OF THE INVENTION

However, with the prior art described above, fuel amount cannot be sensed accurately during vehicle motion.

Other methods known for use in sensing fuel amount in a gas fuel container include methods employing container internal pressure, cumulative fuel flow, or an amount gauge; however, where a gas fuel is used, it is not possible to use an amount gauge, and measurements of pressure and flow, which are affected by temperature changes, are not accurate either. In such instances, while it would be effective to carry out measurement using weight, there is a need to improve measuring accuracy, since change in weight of gases are small in comparison to change in weight of liquids.

In order to address this problem, it is an object of the present invention to improve measuring accuracy of remaining fuel amount in a gas fuel container on the basis of weight. It is a further object to measure fuel amount accurately regardless of vehicle motion.

The invention in a first aspect thereof intended to address the aforementioned problem provides an amount measuring apparatus for measuring, on the basis of weight, the remaining fuel amount in a gas fuel container carried on board a vehicle. The amount measuring apparatus of this first aspect of the invention is characterized by comprising a weight gauge that is disposed between the vehicle and the gas fuel container, and measures the weight of the gas fuel container; an acceleration gauge that measures acceleration of the vehicle; and calculating module that calculates the amount of fuel remaining in the gas fuel container from the measured weight and acceleration.

According to the amount measuring apparatus of the first aspect of the invention, the amount of fuel remaining in a gas fuel container is calculated on the basis of measured weight and acceleration, and is therefore substantially unaffected by temperature or other factors, so that the accuracy of measurement of fuel amount in a gas fuel container can be improved.

In the amount measuring apparatus pertaining to the first aspect of the invention, the calculating module may sample measured weight at times that acceleration measured by the acceleration gauge is 0, and uses the average value thereof as the measured weight to calculate the fuel amount. In this case, measured weight will be unaffected by error caused by acceleration, so that fuel amount can be measured accurately.

In the amount measuring apparatus pertaining to the first aspect of the invention, the calculating module may calculate the fuel amount while taking into consideration acceleration measured by the acceleration gauge in order to calculate true weight from weight measured by the weight gauge. In this case, since true weight is calculated from weight measured by the weight gauge in order to measure fuel amount, regardless of the acceleration value, the effect of acceleration on weight can be taken into consideration in order to improve the accuracy of weight measurement. Accordingly, fuel amount can be measured accurately regardless of conditions of vehicle motion.

In the amount measuring apparatus pertaining to the first aspect of the invention, a plurality of the weight gauges may be provided, the acceleration gauge may be disposed so as to be able to measure acceleration substantially equal to the acceleration to which the weight gauges are subjected, and the calculating module may calculate true weight using the measured weight and weight fluctuation due to the measured analogous acceleration. In this case, since true weight is calculated from weight measured using weight fluctuation due to acceleration, the accuracy of weight measurement can be improved. Accordingly, fuel amount can be measured accurately regardless of conditions of vehicle motion.

In the amount measuring apparatus pertaining to the first aspect of the invention, the gas fuel container may be an elongated body having a first end and second end and fixed to the vehicle via elastic elements in proximity to the first and second ends, and the weight gauge may be disposed on the vehicle in such a way as to indicate a value of 0 when the empty container weight of the gas fuel container counterbalances the elastic force of the elastic elements. In this case, since the empty container weight of the gas fuel container is cancelled out by elastic force, weight measured by the weight gauge can be used directly as the weight of the gas. Empty container weight of the gas fuel container refers to the weight of the gas fuel container when not containing any of the gas normally stored in the gas fuel container.

In the amount measuring apparatus pertaining to the first aspect of the invention, the gas fuel container may be an elongated body having a first end and second end, in proximity to the first end thereof supported rotatably in the vertical direction on the vehicle, and in proximity to the second end thereof disposed on the vehicle via the weight gauge. In this case, fuel amount can be measured by providing only a single weight gauge.

The invention in a second aspect thereof provides a method for measuring, on the basis of weight, the remaining fuel amount in a gas fuel container carried on board a vehicle. The method pertaining to this second aspect of the invention is characterized in that measuring the weight of the gas fuel container, measuring acceleration of the vehicle, and calculating the remaining fuel amount in the gas fuel container with using the measured weight and acceleration.

According to the amount measuring method pertaining to the second aspect of the invention, there can be achieved working effects similar to those of the amount measuring apparatus pertaining to the first aspect of the invention. The amount measuring method pertaining to the second aspect of the invention, the like amount measuring apparatus pertaining to the first aspect of the invention may be realized through various embodiments.

BRIEF DESCRIPTION OF THE DRAWINGS

The amount measuring apparatus and amount measuring method of the invention for measuring, on the basis of weight, remaining fuel amount in a fuel container on board a vehicle will be described hereinbelow through several embodiments with reference to the accompanying drawings, wherein.

DESCRIPTION OF THE PREFERRED EMBODIMENTS

First Embodiment

Figure 1:
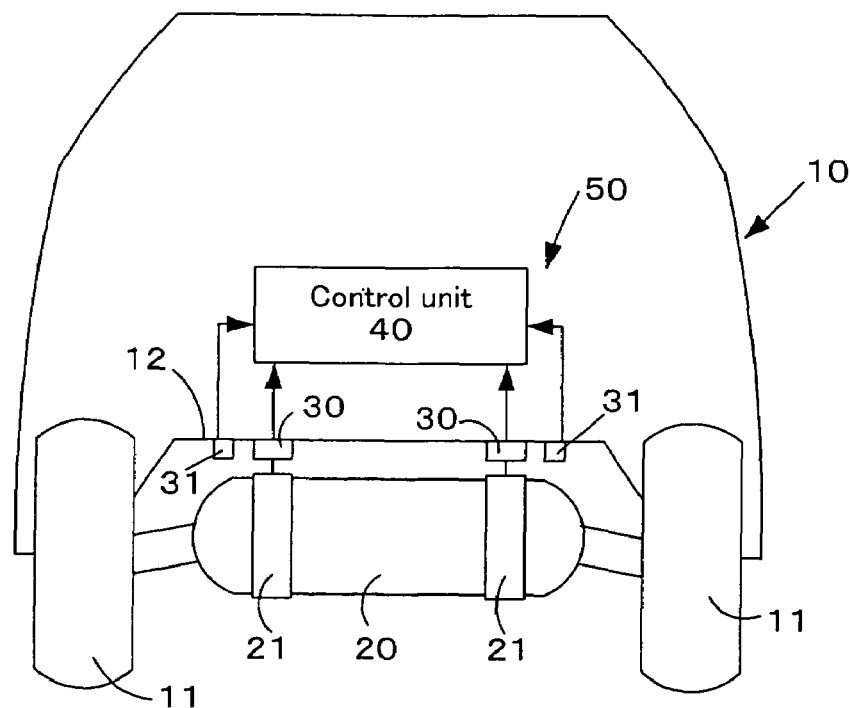
FIG. 1 is a simplified illustration, viewed from the rear of the vehicle, of a vehicle-mounted fuel container amount measuring apparatus pertaining to a first embodiment.
Figure 2:
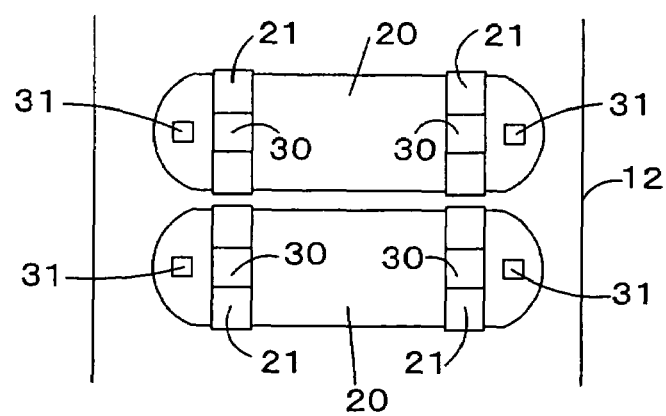
FIG. 2 is a simplified illustration, viewed from above the vehicle, of a vehicle-mounted fuel container amount measuring apparatus pertaining to the first embodiment.
Figure 3:
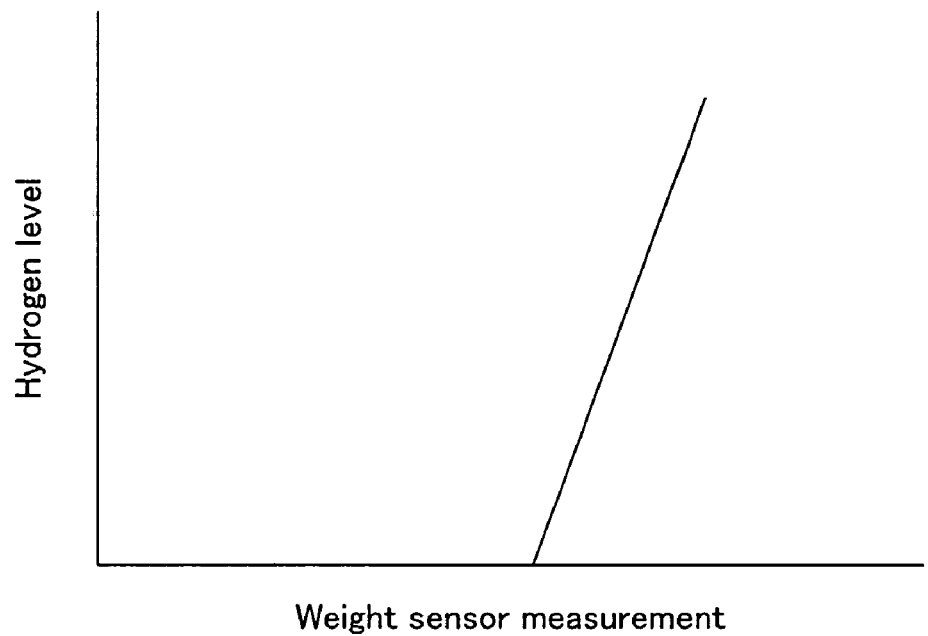
FIG. 3 is an illustration showing correspondence between hydrogen amount and weight measured by the vehicle-mounted amount measuring apparatus to the first embodiment.
Figure 4:
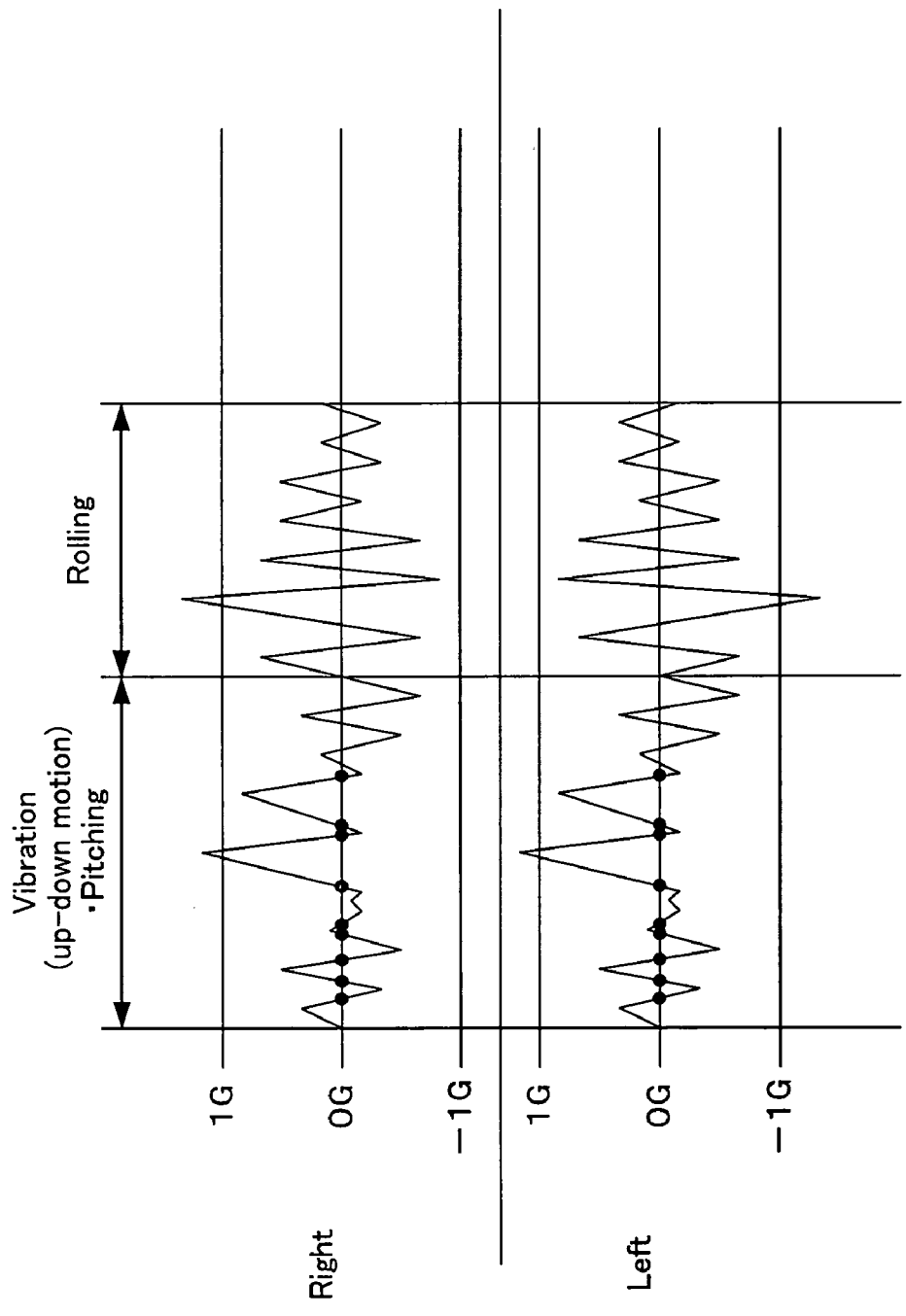
FIG. 4 is an illustration modeling vibration and sway (acceleration G) of a vehicle due to pitching and rolling.

The following description of the general arrangement of a vehicle-mounted fuel container amount measuring apparatus pertaining to a first embodiment makes reference to FIGS. 1 to 4. FIG. 1 is a simplified illustration, viewed from the rear of the vehicle, of a vehicle-mounted fuel container amount measuring apparatus pertaining to a first embodiment. FIG. 2 is a simplified illustration, viewed from above the vehicle, of a vehicle-mounted fuel container amount measuring apparatus pertaining to the first embodiment. FIG. 3 is an illustration showing correspondence between hydrogen amount and weight measured by the vehicle-mounted amount measuring apparatus to the first embodiment. FIG. 4 is an illustration modeling vibration and sway (acceleration G) of a vehicle due to pitching and rolling.

As shown in FIG. 1 and FIG. 2, the vehicle 10 in this embodiment comprises two fuel containers 20 for storing hydrogen, disposed on the vehicle floor 12 inwardly from the wheels 11. Each fuel container 20 is of round cylindrical shape constricted at both ends, and is disposed on the vehicle 10 such that the lengthwise axis thereof intersects the direction of travel of the vehicle 10. Two retaining straps 21 are disposed in proximity to the two ends of each fuel container 20. The retaining strap 21 is a metal band for retaining the fuel container 20 via a rubber or other elastic element wrapped around the container exterior. On the vehicle 10 are disposed weight sensors 30 situated at locations corresponding to the retaining straps 21, and acceleration sensors 31 are disposed in proximity to the weight sensors 30.

The weight sensors 30 may consist of load cells, for example. One end of the weight sensor 30 is joined to the vehicle floor 12 (vehicle 10), with the other end being joined to the corresponding retaining strap 21. Accordingly, the fuel container 20 is attached to the vehicle 10 via the retaining straps 21 and weight sensors 30. Weight values sensed by the weight sensors 30 are associated with hydrogen amount in the manner depicted in FIG. 3. In FIG. 3, the fact that measurements by the weight sensors 30 begin to rise at midpoint is due to the fact that the weight sensors 30 are attached directly to the fuel containers 20 so that measurements corresponding to hydrogen amount cannot be obtained until the weight thereof exceeds the container weight. Here, container weight of the fuel containers 20 refers to container weight in the absence of any hydrogen stored therein; the weight of the hydrogen-storage alloy is included in container weight.

Acceleration sensors 31 may consist of piezoelectric elements, for example. One acceleration sensor 31 is provided for each of the weight sensors 30 so that change in acceleration at each weight sensor 30 can be measured correctly. The vehicle 10 undergoes up-and-down motion (vibration), rolling, and pitching (sway) in association with driving thereof, this vibration and sway being sensed by the left and right acceleration sensors 31 as shown in FIG. 4. In this embodiment, since two acceleration sensors 31 are disposed in the lateral direction with respect to the direction of travel of the vehicle 10, the front half of FIG. 4 shows change in acceleration due to vibration or pitching, while the back half shows change in acceleration due to rolling.

The fuel containers 20 have a hydrogen-storage alloy inside, with hydrogen being stored in a state of being occluded in the hydrogen-storage alloy. For example, 5 kg of hydrogen may be stored in 300 kg of hydrogen-storage alloy, and thus a highly accurate measuring method will be required in order to measure changes in the amount of hydrogen.

In the vehicle 10 of the first embodiment, operating status thereof is controlled by means of a control unit 40. The control unit 40 comprises a processing function (CPU) and a memory function (ROM, RAM) for storing a map, a processing program for measuring fuel amount, and the like. The weight sensors 30 and acceleration sensors 31 are connected to the control unit 40, which inputs weight M and acceleration α sensed by the sensors 30, 31. The amount measuring apparatus 50 of the first embodiment comprises at least the weight sensor 30, the acceleration sensor 31, and the control unit 40 as constitutional elements.

Figure 5:
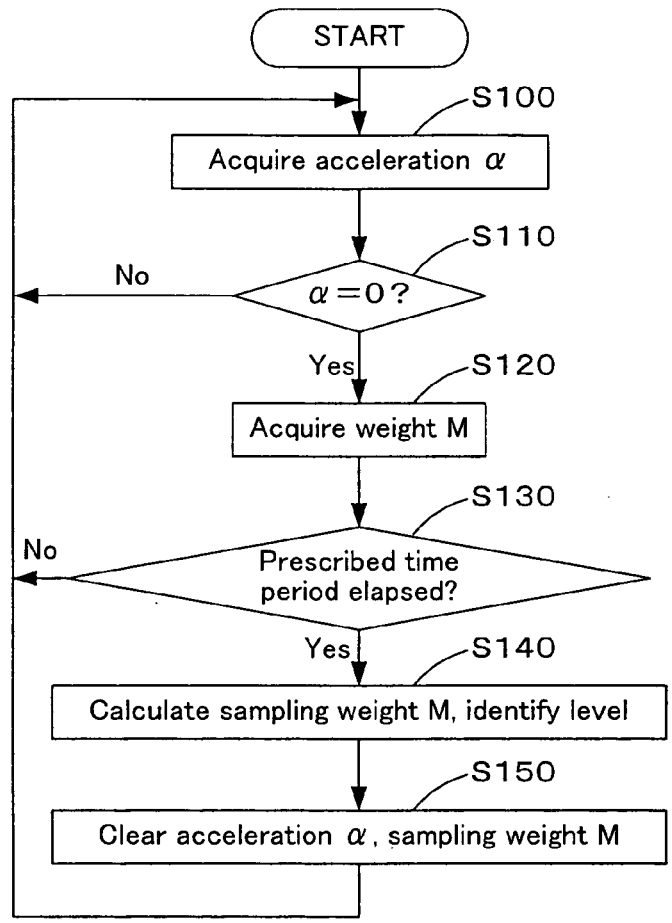
FIG. 5 is a flowchart showing a processing routine executed in the amount measuring process pertaining to the first embodiment.

The following description of the amount measuring process executed by the amount measuring apparatus 50 of the first embodiment makes reference to FIG. 5. FIG. 5 is a flowchart showing a processing routine executed in the amount measuring process pertaining to the first embodiment.

The processing routine is executed at predetermined time intervals, in units composed of combinations of the acceleration sensors 31 with the weight sensors 30. When the processing routine starts, the control unit 40 acquires acceleration α sensed by the acceleration sensor 31 (Step S100), and determines whether acceleration α=0 (Step S110).

In the event that the control unit 40 decides that acceleration α does not equal zero (Step S110: No), the control unit 40 again moves to Step S100 and acquires acceleration α. In the event that the control unit 40 decides that acceleration α equals zero (Step S110: Yes), the control unit 40 acquires weight M sensed by the weight sensor 30 (Step S120). Since weight M sensed by the weight sensor 30 changes with the effects of acceleration α, weight M in the absence of the effects of acceleration α, i.e. when acceleration α=0, is sampled.

The control unit 40 then determines whether a predetermined prescribed time period has elapsed (Step S130), and if the control unit 40 determines that the prescribed time period has not elapsed (Step S130: No), moves to Step S100 and continues sampling acceleration α. If the control unit 40 determines that the prescribed time period has elapsed (Step S130: Yes), the control unit 40 calculates the average value of the sampled values of weight M, and using this calculated average value and the map shown in FIG. 3, specifies a hydrogen amount (Step S140); the control unit 40 then clears the values (Step S150) and continues sampling.

In FIG. 4, points at which acceleration α=0 are indicated by black dots; within the prescribed time period, weight M is sampled repeatedly at the specified timing.

As described foregoing, according to the on-board fuel container amount measuring apparatus 50 of first embodiment, where acceleration α sensed by the acceleration sensor 31 is zero, weight M is acquired from the weight sensor 30 so that the correct weight M can be obtained in the absence of the effects of acceleration α, i.e. while eliminating error due to acceleration α. By improving the accuracy of measurement in this way, is it generally possible to correctly sense the weight of the gas, which has minimal change in weight associated with changes in amount as compared to liquids. Accordingly, the accuracy [of measurement] of hydrogen amount in the fuel container 20 specified on the basis of weight M can be improved.

Additionally, in the amount measuring apparatus 50 of first embodiment, since the acceleration sensor 31 is associated with each weight sensor 30, acceleration α acting on each weight sensor 30 can be sensed properly, making it possible to improve the accuracy of sampling timing of weight M executed when acceleration α=0.

Second Embodiment

Figure 6:
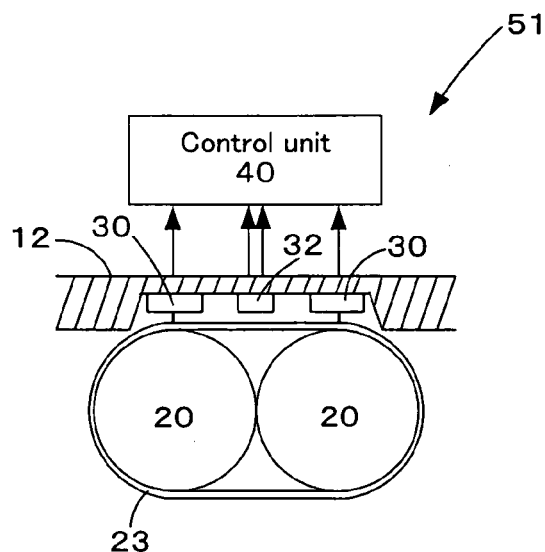
FIG. 6 is a side view showing a simplified arrangement of a weight sensor 30 and an acceleration sensor 32 making up the amount measuring apparatus 51 pertaining to a second embodiment.
Figure 7:
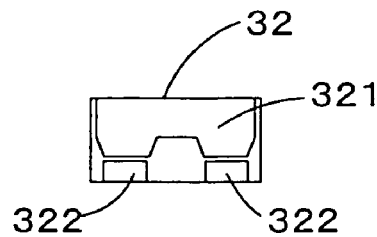
FIG. 7 is a model diagram showing characteristic features in the arrangement of acceleration sensor 32 in the second embodiment.
Figure 8:
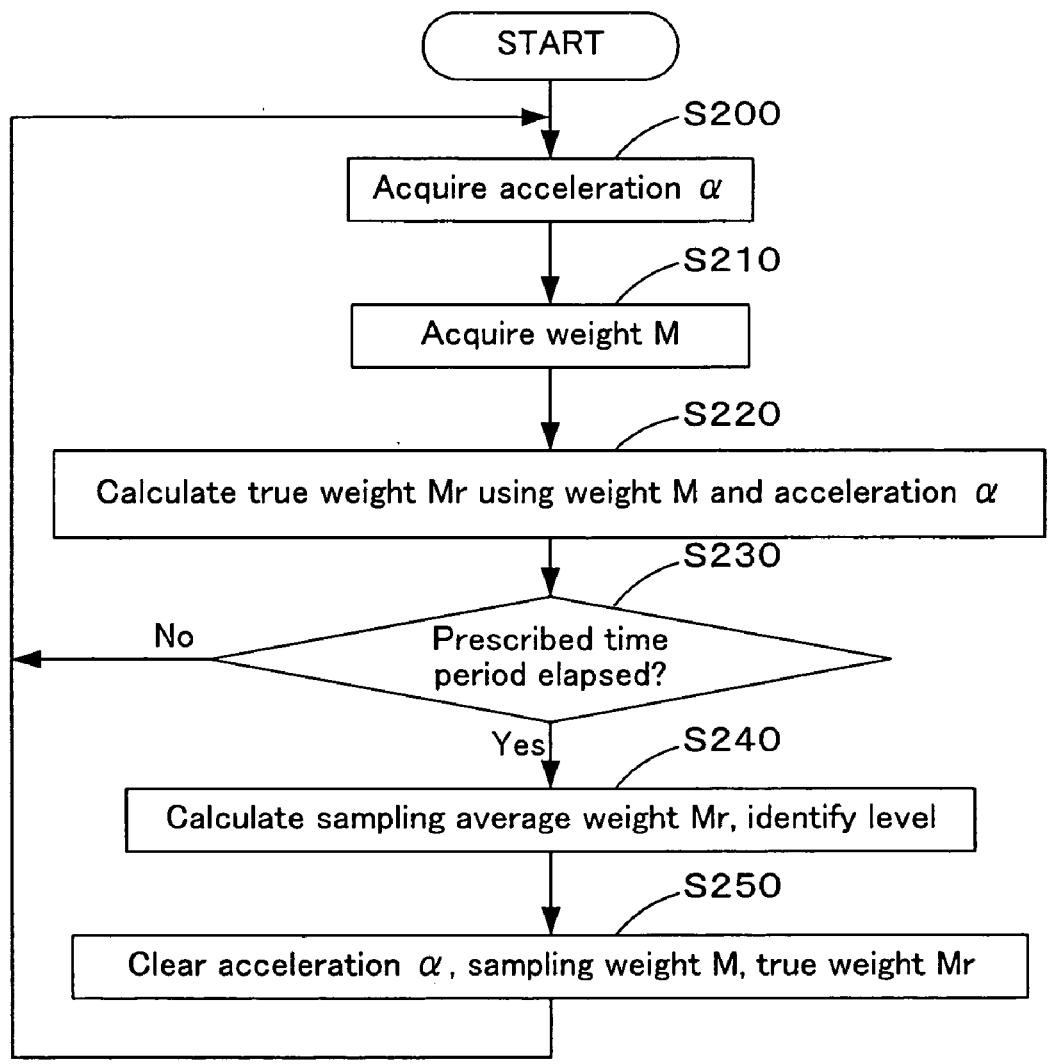
FIG. 8 is a flowchart showing a processing routine executed in the amount measuring process pertaining to the second embodiment.

The following description of the general arrangement of a vehicle-mounted fuel container amount measuring apparatus pertaining to a second embodiment makes reference to FIGS. 6 to 8. FIG. 6 is a side view showing a simplified arrangement of the the weight sensor 30 and an acceleration sensor 32 making up the amount measuring apparatus 51 pertaining to a second embodiment. FIG. 7 is a model diagram showing characteristic features in the arrangement of the acceleration sensor 32 in the second embodiment. FIG. 8 is a flowchart showing a processing routine executed in the amount measuring process pertaining to the second embodiment.

The fuel container amount measuring apparatus pertaining to second embodiment is mounted on the vehicle 10 described first embodiment. As shown in FIG. 6, in the second embodiment a set of two fuel containers 20 is held together by a retaining strap 23. Each fuel container 20 is disposed on the vehicle floor 12 via the weight sensor 30. Other arrangements, such as the direction in which the fuel containers 20 are mounted, are the same as for the fuel containers 20 of the first embodiment.

The acceleration sensor 32 is provided on the vehicle floor 12 at an intermediate location between the weight sensors 30 corresponding to the fuel containers 20. As shown in FIG. 7, the acceleration sensor 32 has an operating portion 321 with two raised portions corresponding to the weight sensors 30 disposed to either side thereof, and piezoelectric element portions 322 disposed corresponding to each operating portion 321. The acceleration sensor 32 outputs to the control unit 40 the individual sensor signals produced by the piezoelectric element portions 322. By providing this arrangement, it is possible to properly sense acceleration α of magnitude proportional to the acceleration applied to each weight sensor 30, and similar weight for the angle. Accordingly, in this embodiment, there are provided two weight sensors 30 for each one fuel container 20, for a total of four for the two fuel containers 20 that make up a set; and two acceleration sensors 32 for the two fuel containers 20 that make up a set.

Where there is employed an acceleration sensor that can derive acceleration in x, y, z three-dimensional space, while it is possible to calculate location at space at that point, it is not at all possible to detect rotation about the z axis, for example. By using three-dimensional acceleration sensors at two discrete locations, it becomes possible to calculate relative positions within space, and to thereby be able to derive all information such as rotational pitching, rolling, and so on. Also, since it is possible to calculate acceleration in any direction at locations on the vehicle, acceleration can be calculated for each weight sensor.

Since weight sensors can measure in only one direction, it is sufficient to be able to measure acceleration in that direction. Where acceleration is measured in the same direction as the measuring direction of weight sensors at any two discrete points on a line perpendicular to the weight sensor measuring direction, it becomes possible to calculate acceleration in the same direction as any point on the same line.

The following description of the amount measuring process executed by the amount measuring apparatus 51 of the second embodiment makes reference to FIG. 8. The processing routine is executed repeatedly at predetermined time intervals. When the processing routine starts, the control unit 40 acquires acceleration α sensed by the acceleration sensor 32 (Step S200). As described previously, two acceleration α readings are output from one acceleration sensor 32, with the control unit 40 acquiring the two acceleration α readings from the acceleration sensors 32.

The control unit 40 then acquires weight M from each weight sensor 30 (Step S210), and using acceleration α and weight M acquired in this manner, calculates true weight Mr using the following equation (Step S220).

$$Mr=g(M/(g-\alpha)$$

Here, g denotes gravitational acceleration.

That is, this embodiment employs the acceleration sensors 32 designed so as to properly sense acceleration α of magnitude proportional to acceleration on the weight sensors 30 so that acceleration α which affects the measured weight M of the fuel containers 20 by the weight sensors 30 is taken into consideration, whereby it is possible to derive true weight Mr not affected by acceleration α.

The control unit 40 determines whether a predetermined prescribed time period has elapsed (Step S230), and if the control unit 40 determines that the prescribed time period has not elapsed (Step S230: No), again moves to Step S200 and calculates true weight Mr. On the other hand, if the control unit 40 determines that the sampling period has elapsed (Step S230: Yes), the control unit 40 calculates the average value of the sampled values of true weight Mr, and using a map or the like, determines a hydrogen amount corresponding to the value of the calculated true weight Mr minus the weight of the empty fuel container 20 (Step S240); the control unit 40 then clears the values (Step S250) and continues sampling.

As described previously, according to the amount measuring apparatus 51 of the second embodiment, since acceleration sensors designed to properly sense acceleration α substantially equal to load applied to each weight sensor 30 are used as the acceleration sensors 23, it is possible to derive true weight Mr unaffected by acceleration α, i.e. while eliminating error due to acceleration α. As a result, the correct amount of hydrogen can be measured. By improving the accuracy of measurement in this way, is it generally possible to correctly sense the weight of the gas, which has minimal change in weight associated with changes in amount as compared to liquids, making it possible to improve the accuracy of measurement of hydrogen amount in the fuel container 20 specified on the basis of weight M.

Additionally, since it is possible to take into account acceleration α, which affects the measured weight M of the fuel containers 20 by the weight sensors 30, correct weight Mr from which error due to acceleration α has been eliminated can now be derived, even where acceleration α is not zero. Accordingly, while improving the accuracy of hydrogen amount measurement, opportunities to measure hydrogen amount can be expanded appreciably. As a result, it becomes possible to constantly control operating status of hydrogen-consuming systems, including fuel cell systems, on the basis of correct hydrogen amounts.

Other Embodiments (1) Whereas in the first embodiment, weight M is always sampled when acceleration α sensed by acceleration sensor 31 is zero, an arrangement such as the following would be possible as well. Generally, a certain amount of time is required before suspended matter, i.e. the hydrogen-storage alloy, which has been forced into suspension inside the fuel container 20 due to the action of acceleration α, again settles down; the time required to settle tends to be particularly extended where the acceleration α exceeds 1 G. Thus, as shown in FIG. 4, it would be possible when acceleration α sensed by the acceleration sensor 31 has exceeded 1 G to sample weight M after a predetermined standby time has elapsed.

In this case, it becomes possible to reduce error in measuring weight M due to hydrogen-storage alloy forced into suspension inside the fuel container 20 by a high amount of acceleration α, so as to sense weight M more accurately. Through sensing of accurate weight M of the fuel container 20, it becomes possible to determine (measure) accurate hydrogen amount.

Figure 9:
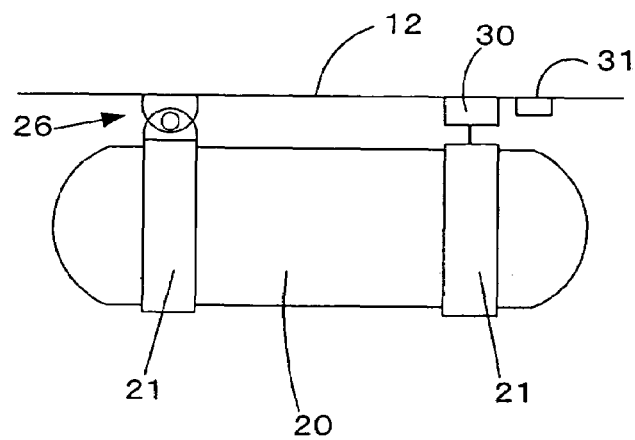
FIG. 9 is an illustration of another mode of mounting the fuel container 20 on a vehicle.

(2) Whereas in the embodiments hereinabove, a single fuel container 20 is fixed at two points to the vehicle floor 12, with weight sensed by the weight sensors 30, it would be possible instead to have one of the two points linked by means of a vertically rotatable rotating link portion 26 as shown in FIG. 9, with the fuel container 20 fixed via the weight sensor 30 at the remaining one point. Here, FIG. 9 is an illustration of another mode of mounting the fuel container 20 on a vehicle.

In this case, it would be sufficient to provide a single weight sensor 30 for a single fuel container 20, reducing the number of the weight sensors 30 required. The parameter sensed by the weight sensor 30 is moment.

Figure 10:
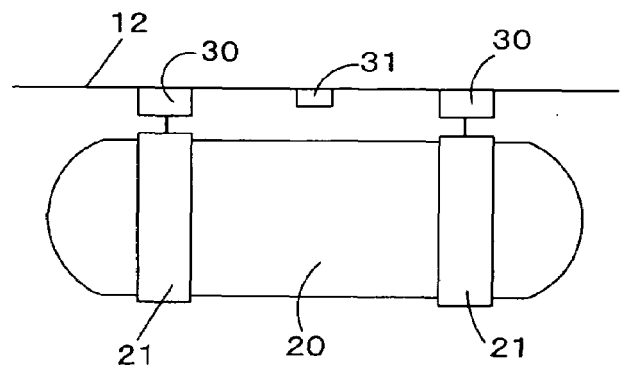
FIG. 10 is an illustration of another example of acceleration sensor 31 arrangement in the amount measuring apparatus 50 pertaining to the first embodiment.

(3) Whereas in the first embodiment hereinabove, one acceleration sensor 32 is disposed in proximity to each weight sensor 30, it would be possible instead to dispose one acceleration sensor 31 at a medial location between two weight sensors 30 provided to one fuel container 20, as shown in FIG. 10. Here, FIG. 10 is an illustration of another example of the acceleration sensor 31 arrangement in the amount measuring apparatus 50 pertaining to the first embodiment. In this case, since the acceleration sensor 32 is disposed at a medial location between two weight sensors 30, acceleration applied to the weight sensors can be sensed properly.

Figure 11:
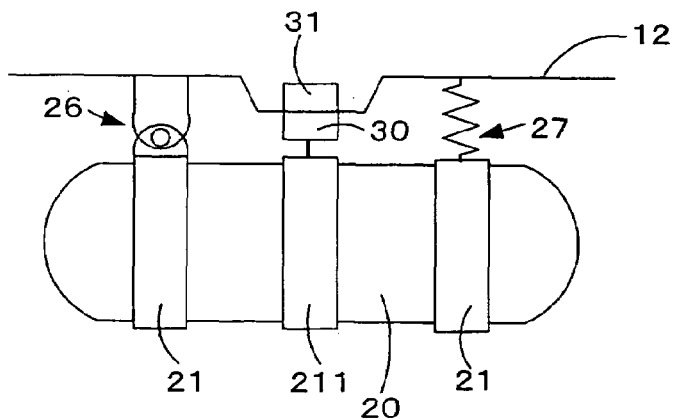
FIG. 11 is an illustration of another mode of mounting the fuel container 20 on a vehicle.
Figure 12:
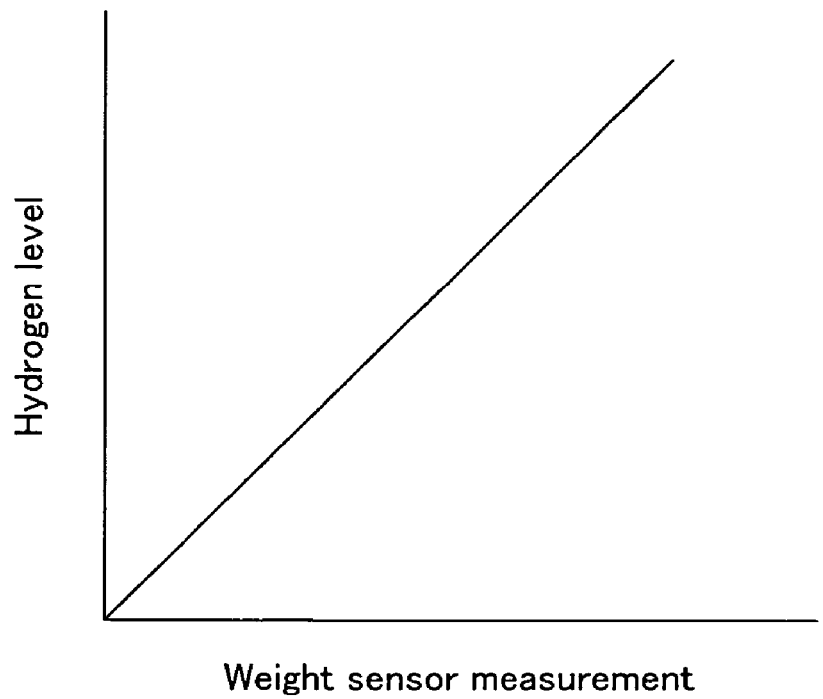
FIG. 12 is an illustration of output characteristics of the weight sensor 30, obtained in the mounting mode shown in FIG. 11.

(4) Whereas in the embodiments hereinabove, the measuring apparatus 50, 51 employ an arrangement whereby the fuel container 20 hangs under its own weight (weight when empty) from the weight sensors 30, there could instead be employed an arrangement whereby the weight of the fuel container 20 is cancelled out by the elastic force of an elastic element, as shown in FIG. 11. Here, FIG. 11 is an illustration of another mode of mounting the fuel container 20 on a vehicle. FIG. 12 is an illustration of output characteristics of the weight sensor 30, obtained in the mounting mode shown in FIG. 11.

In the example of mounting the fuel container 20 on the vehicle floor 12 shown in FIG. 11, with the empty fuel container 20 suspended from the vehicle floor 12 by means of retaining straps 21, a rotating linkage 26, and a spring (elastic element) 27 and with the elastic force of the spring counterbalancing the weight of the empty fuel container 20, the fuel container 20 is connected to the weight sensor 30 via a weight sensor-linked retaining strap 211. As a result, the fuel container 20 does not hang under its own weight from the weight sensor 30, so that the weight of the occluded hydrogen (hydrogen amount) only can be measured directly by the weight sensor 30.

Accordingly, when acceleration α sensed by the acceleration sensor 31 is zero, it is possible to directly use the weight M measured by the weight sensor 30 as the hydrogen amount, without having to consider the weight of the empty fuel container 20. When the fuel container 20 is empty, this means that is contains hydrogen-storage alloy, but with no hydrogen occluded therein. The elastic element is not limited to a spring 27, but could consist of any elastic element having elastic force able to cancel out the weight of the fuel container 20. The spring 27 may be fabricated of metal or resin, and may be of coil configuration or plate shape.

Here, there has been described an arrangement wherein the initial weight bearing on the weight sensor 30 is assigned a value of 0, but it need not necessary be a value of zero. In general, since fuel container weight is about 20 times hydrogen weight, provided that the weight bearing on the weight sensor 30 using this method can be minimized, even if it is not zero, it will be possible to improve measuring accuracy and provide a more compact measuring apparatus.

(5) In the above embodiments, there is described case of a hydrogen-storage alloy as the form in which hydrogen is stored; however, the invention is also applicable to instances where high-pressure hydrogen is stored without the use of a hydrogen-storage alloy. In addition, the invention is not limited to hydrogen, being applicable as well to storage of other fuel gases, i.e. natural gas. Further more, the invention is not limited to fuel gases, being applicable as well to storage of gases such as oxygen or nitrogen. That is, in the embodiments hereinabove, since the amount of contents in the fuel container 20 is measured (sensed) by weight, it would be appropriate for measuring amounts where contents are gaseous. Further, since amounts can be measured taking into consideration the effects of acceleration $\alpha$ on sensed weight M, amounts can be measured accurately even in the case of gaseous contents, which have smaller weight change than liquids.

(6) The apparatus and method of the embodiments hereinabove may also be realized in the form of a computer program, or a storage medium (electronic, magnetic, or magnetooptical medium) having a computer program recorded thereon.

Whereas a amount measuring apparatus and a amount measuring method for measuring remaining fuel amount in a fuel container on board a vehicle on the basis of weight pertaining to the invention has been shown and described in terms of embodiment, the embodiments of the invention set forth herein are intended to aid in understanding of the invention and should not be construed as limiting thereof Various modifications and improvements are possible without departing from the scope and spirit of the invention as set forth in the claims, and such equivalents will naturally be included in the invention.

What is claimed is:

1. An amount measuring apparatus for measuring, on the basis of weight, the remaining fuel amount in a gas fuel container carried on board a vehicle, said amount measuring apparatus comprising:
    a weight gauge that is disposed between said vehicle and said gas fuel container, and measures the weight of said gas fuel container;
    an acceleration gauge that measures acceleration of said vehicle; and
    a calculating module that samples measured weight at times that acceleration measured by said acceleration gauge is 0, samples measured weight after a predetermined time period if the measured acceleration exceeds a predetermined acceleration, and calculates the amount of fuel remaining in said gas fuel container from said measured weight.

2. An amount measuring apparatus according to claim 1 wherein
    said calculating module uses an average value of the sampled measured weights as said measured weight to calculate said fuel amount.

3. An amount measuring apparatus according to claim 2 wherein
    said gas fuel container is an elongated body having a first end and second end, and fixed to said vehicle via elastic elements in proximity to said first and second ends, and
    said weight gauge is disposed on said vehicle in such a way as to indicate a value of 0 when the empty container weight of said gas fuel container counterbalances the resilient force of said elastic elements.

4. An amount measuring apparatus according to claim 1 wherein said gas fuel container is an elongated body having a first end and second end, and fixed to said vehicle via elastic elements in proximity to said first and second ends, and
    said weight gauge is disposed on said vehicle in such a way as to indicate a value of 0 when the empty container weight of said gas fuel container counterbalances the resilient force of said elastic elements.

5. An amount measuring apparatus according to claim 1 wherein
    said gas fuel container is an elongated body having a first end and second end, in proximity to said first end thereof supported rotatably in the vertical direction on said vehicle, and in proximity to said second end thereof disposed on said vehicle via said weight gauge.

6. A method of measuring, on the basis of weight, the remaining fuel amount in a gas fuel container carried on board a vehicle, said amount measuring method comprising:
    measuring the weight of said gas fuel container;
    measuring acceleration of said vehicle;
    sampling measured weight at times that acceleration measured by said acceleration gauge is 0, and if the measured acceleration exceeds a predetermined acceleration, sampling measured weight after a predetermined time period; and
    calculating the remaining fuel amount in said gas fuel container using said measured weight.

7. An amount measuring method according to claim 6, wherein
    calculation of said remaining fuel is executed by using an average value of the sampled measured weights as said measured weight.

* * * * *